United States Patent [19]

Licht

[11] 4,133,585

[45] Jan. 9, 1979

[54] RESILIENT FOIL JOURNAL BEARING
[75] Inventor: Lazar Licht, San Mateo, Calif.
[73] Assignee: United Technologies Corporation, Hartford, Conn.
[21] Appl. No.: 822,012
[22] Filed: Aug. 4, 1977
[51] Int. Cl.$^2$ ............................................. F16C 17/16
[52] U.S. Cl. ......................................... 308/9; 308/26; 308/121; 308/160; 308/DIG. 1
[58] Field of Search ............ 308/9, DIG. 1, DIG. 15, 308/160, 73, 26, 121, 122, 5 R, DIG. 4

[56] References Cited

U.S. PATENT DOCUMENTS

| 3,635,534 | 1/1972 | Barnett | 308/160 X |
| 3,795,427 | 3/1974 | Licht et al. | 308/9 |

OTHER PUBLICATIONS

Licht and Branger, "Motion of a Small High-Speed Rotor in 3 Types of Foil Bearings", Journal of Lubrication Technology, Trans. ASME, vol. 97, Ser. F, No. 2, pp. 270-282, Apr. 1975.

Primary Examiner—Trygve M. Blix
Assistant Examiner—Douglas C. Butler
Attorney, Agent, or Firm—John D. Del Ponti

[57] ABSTRACT

A fluid-film journal bearing wherein a resilient foil-insert assembly is disposed between a rotatable journal and a stationary retainer member. The resilient foil-insert may comprise a continuous length of foil coiled into a plurality of layers with the innermost layer providing a bearing surface and another layer preformed into a quasipolygonal configuration.

14 Claims, 12 Drawing Figures

RESILIENT FOIL JOURNAL BEARING

The Government has rights in this invention pursuant to Contract Number N00014-76-C-0191 awarded by the Department of the Navy.

BACKGROUND OF THE INVENTION

1. Field of the Invention

This invention relates to fluid-film bearings for rotating machinery and more particularly to journal bearings which include resilient bearing-inserts for efficient support of high-speed rotors.

2. Description of the Prior Art

Rigid and rigidly-mounted fluid bearings have limitations imposed by speed and mass, which govern the onset of instability. The latter, referred to generally as "half-frequency" and "fractional frequency" whirl, causes a sudden growth of amplitudes of the journals, at a speed when self-excited vibrations set in, and generally leads to bearing and machine damage, or destruction. Furthermore, such bearings are not tolerant of misalignment, temperature gradients and elevated temperatures, dirt and foreign particles and, further, do not respond favorably to shock and impact, especially in the case of gas bearings. In the case of the latter, operation is very sensitive to changes in clearance, so that in the presence of thermal gradients an adverse effect of performance is almost unavoidable. Bearings of expensive and complex construction, such as pivoted-shoe bearings, circumvent some of the foregoing problems, but introduce others such as pivot fretting, shoe flutter and difficulties of assembly. In addition, they are expensive and stability is not insured. Recent efforts to improve journal bearings have resulted in a variety of foil bearings, some of which are shown in U.S. Pat. Nos. 3,635,534; 3,747,997; 3,795,427 and 3,809,443 and in the publication by L. Licht and M. Branger entitled "Motion of a Small High-Speed Rotor in 3 Types of Foil Bearings", *Journal of Lubrication Technology,* Trans. ASME Vol. 97, Ser. F, No. 2, April 1975, pp. 1-11. While various prior art foil bearings are known to provide remedies to some of the foregoing difficulties, flexibility without adequate damping will not insure stability, and the introduction of compliance cannot be accomplished at the expense of other important bearing characteristics. Also, certain of the prior art bearings suffer the disadvantage of having foil supports characterized by sharp creases prone to crack propagation or by corrugations prone to buckling.

In sum, although the prior art techniques may be useful, the need for further improvements has remained. Unquestionably, there is a need for an improved fluid-film journal bearing for the support of high-speed rotors (such as turbocompressors, turbochargers, turbogenerators, turbine gas generators, cryogenic expanders, blowers, pumps, aircraft air-cycle machines, centrifuges, scanners, yarn spinners and processors and the like).

SUMMARY OF THE INVENTION

It is a general object of the present invention to provide an improved fluid-film and resilient journal bearing which can remedy the deficiencies of the prior art. It is a more specific object of the present invention to provide a hydrodynamic journal bearing, which (a) is capable of attaining high speeds without danger of destruction at the onset of self-excited whirl, (b) is capable of operating in the presence of high temperatures and thermal gradients, (c) is tolerant of contaminants and abrasive particles, (d) is able to accommodate misalignment, manufacturing inaccuracies and differential expansion of bearing components, (e) is endowed with inherent damping and flexibility and with good wipe-wear characteristics, (f) is inexpensive and simple to manufacture and (g) has a resilient foil-element that is not prone to buckling, folding or cracking.

The present invention contemplates a novel and improved journal bearing insert comprising a resilient and continuous length of foil having a portion thereof initially preformed to the shape of an open polygon and coiled within the bore of a retaining cartridge. The vertices of the quasi-polygonal portion are rounded to a specified curvature and the sides of the polygon join and are tangent to the rounded vertices. The angles between the sides may be larger or smaller than those of a corresponding regular polygon. The vertices and length of sides and angles between them need not be identical. In a first embodiment, the vertices are contiguous to the bore of the retainer and are followed by one or several turns of plane foil, the innermost providing the flexible bearing surface. In an alternate embodiment the deformed polygonal section is sandwiched between inner and outer layers of plane foil.

Secondary features of the invention may comprise matrices of raised lands between foil layers to improve damping and herringbone grooves or Rayleigh steps to modify the topography of the bearing surface and thus further alter the bearing characteristics. The thickness of the foil-insert may be sectionally or continuously variable and the foil surface-quality may be modified in relation to frictional characteristics and boundary-lubrication requirements.

BRIEF DESCRIPTION OF THE DRAWINGS

An understanding of the invention will become more apparent to those skilled in the art by reference to the following detailed description when viewed in light of the accompanying drawings wherein.

DESCRIPTION OF THE PREFERRED EMBODIMENTS

Figure 1:
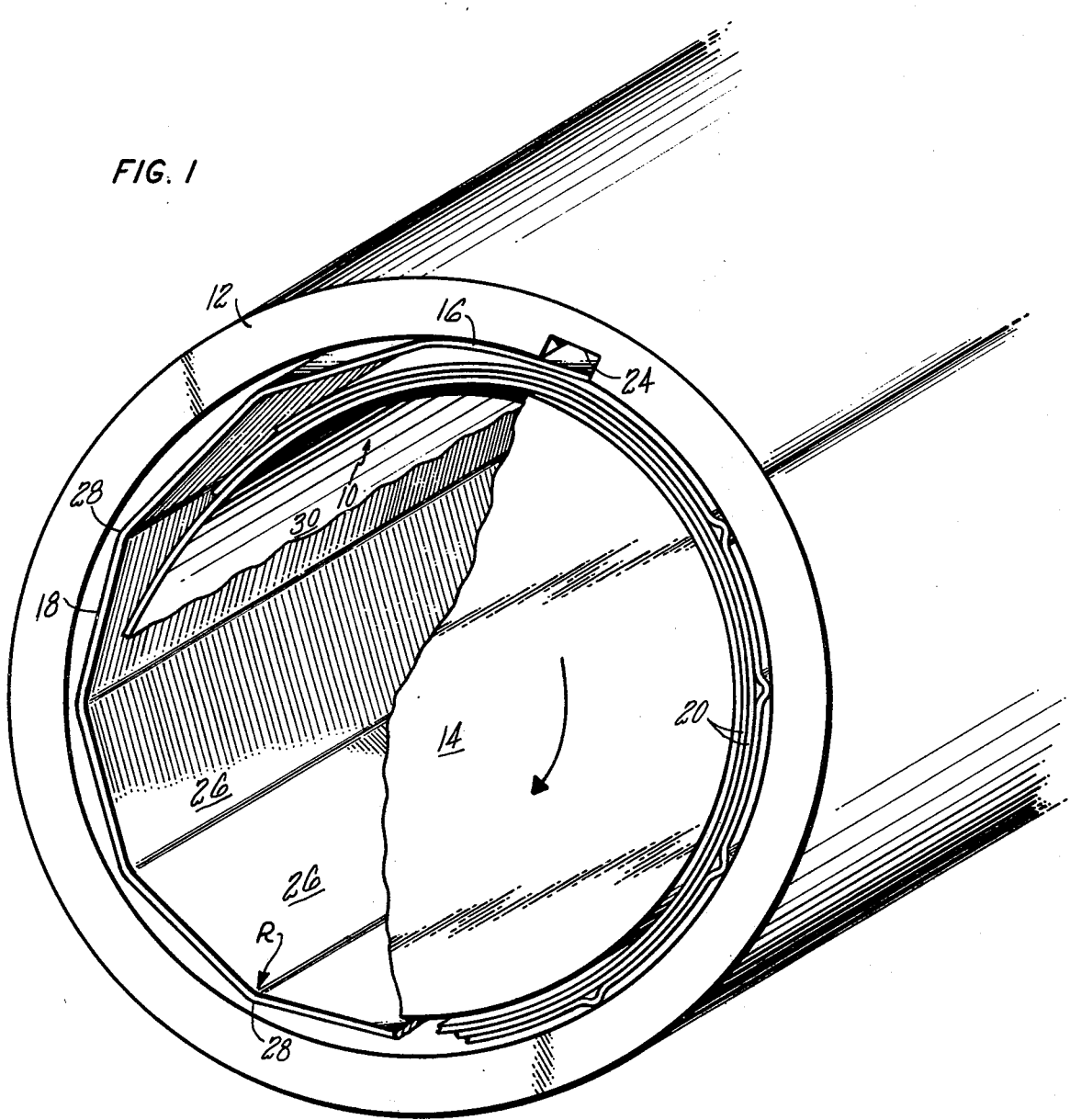
FIG. 1 is a perspective view of a journal bearing incorporating the present invention shown partially with and partially without the presence of a journal.
Figure 3:
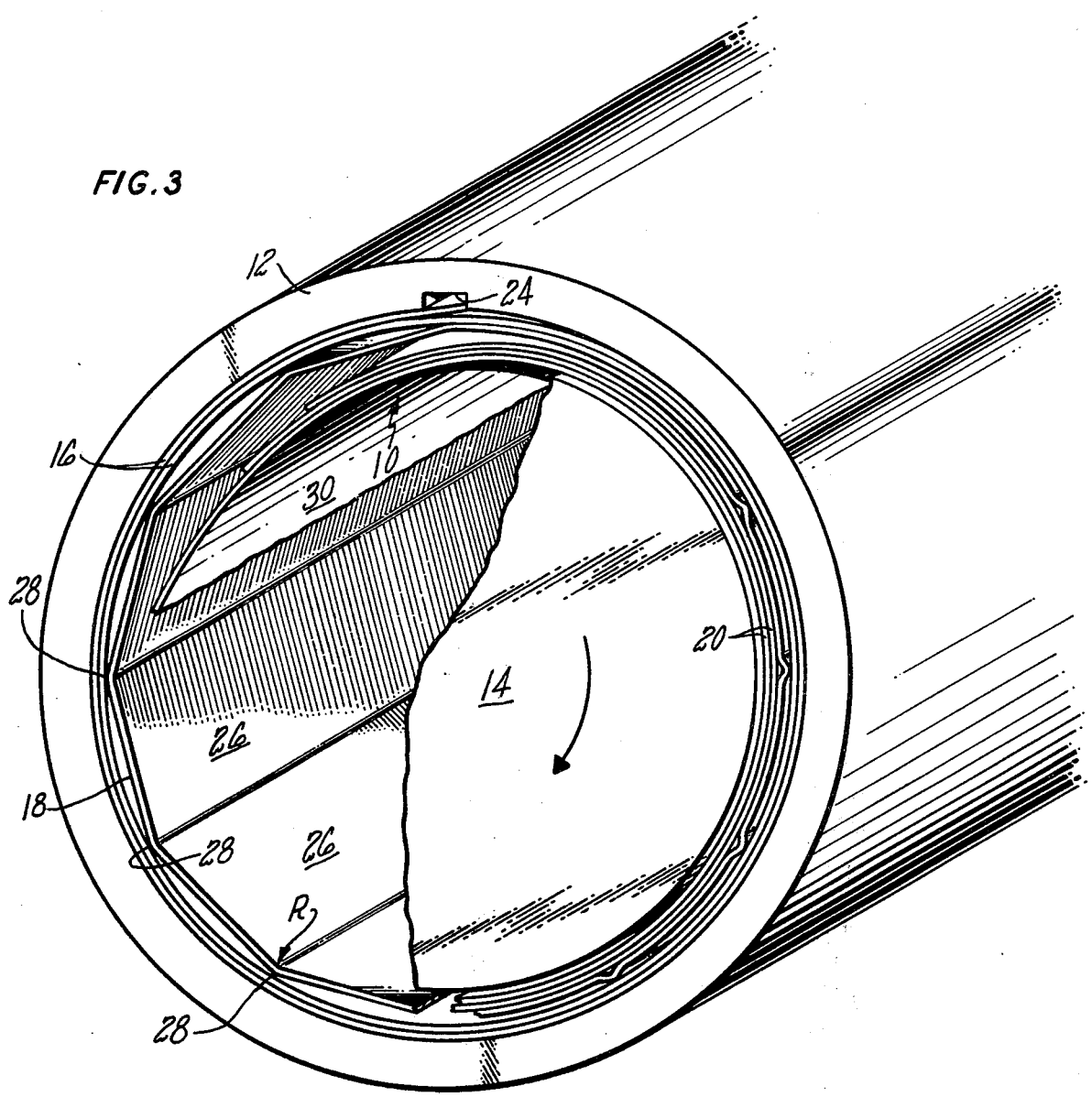
FIG. 3 is a perspective view of an alternate embodiment of the journal bearing shown in FIG. 1.

Referring now to the drawings, wherein like numerals indicate like parts, a foil element 10 is shown as being positioned between a cartridge (or shell or retainer) 12 and a journal 14. The foil element 10 is in the shape of a hollow cylinder formed by a plurality of turns and is comprised of three integral portions or sections 16, 18 and 20. The outermost portion 16 is initially plane and has its free end secured to the retainer 12 by appropriate means. As shown in FIGS. 1 and 3, the free end of the foil portion 16 is engaged in an axial slot 24 formed in the inner surface of the retainer 12. In FIG. 1, the portion 16 is of short length and extends for less than a full turn. In FIG. 3, the foil portion 16 is coiled within the retainer for one or more turns. The middle portion 18 of the foil 10 is in the form of an open polygon, with sides 26 joined together by rounded or radiused vertices 28 which are bent to a predetermined radius and angle, the sides initially being tangent or faired in to the curved section of the vertex. It will be appreciated that the rounded and radiused vertices constitute an important aspect of the invention, because they affect the overall stiffness of the foil-insert and at the same time prevent the inception and propagation of cracks, both during fabrication and operation. Also, the vertices in conjunction with the sides provide a supporting structure which is not prone to buckling type of failure. As an example, for a foil 0.001 to 0.003in. (0.025 to 0.075mm) thick, the radius of curvature R may typically be between 0.020 to 0.040in. (0.5 to 1.0mm).

The inner portion 20 of the foil 10 is, like the outer portion 16, initially plane and comprises a plurality of coils with the innermost coil presenting a bearing surface 30 to the journal 14.

As will be appreciated, the basic principle of operation involves the hydrodynamic generation of pressure in the clearance between the inner coil surface and the rotating journal, which produces a net load capacity and film stiffness. In the present invention, the bearing surface is compliant and is supported on a flexible element, so that the clearance shape, which may vary in both space and time, depends not only on the eccentricity of the journal, but also on the deflection of the bearing surface. The local deflection is, in turn, governed by the pressure generated in the lubricating film and by the stiffness and damping characteristics of the entire foil-insert, the inertia of which is negligible in comparison with that of the rotor.

Since there are several layers of foil, and since small motion occurs between the layers and between the outer portion 16 and the bearing cartridge 12, there ensue damping forces that are due to both dry friction and to viscous dissipation (squeezing of the fluid in the interstitial and other narrow clearances).

Figure 2:
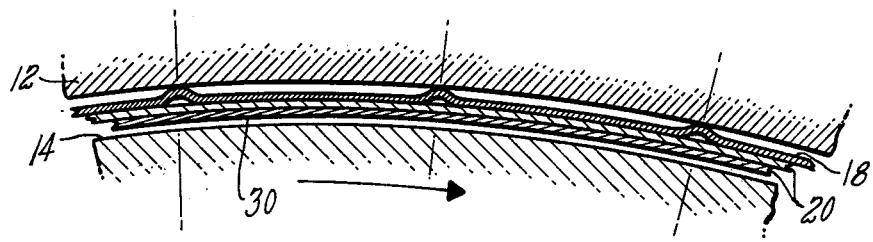
FIG. 2 is an enlarged partial sectional view of the bearing shown in FIG. 1.
Figure 4:
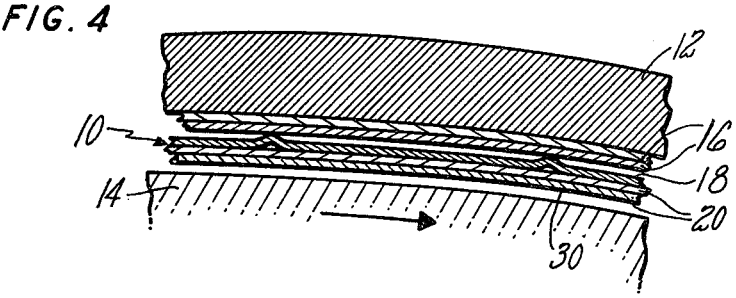
FIG. 4 is an enlarged partial sectional view of the bearing shown in FIG. 3.
Figure 10:
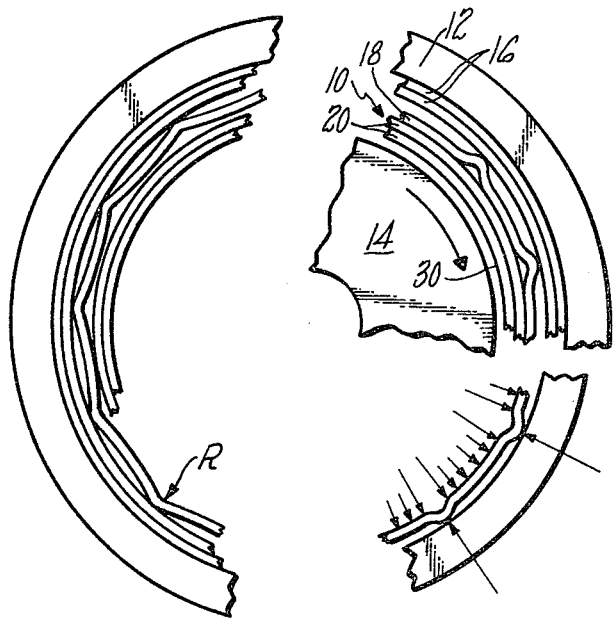
FIG. 10 is a broken sectional view of the shape of the foil before and after insertion of the journal as well as the reactions at the vertices of the quasi-polygonal portion of the foil.

In the left-hand side of FIGS. 1, 3 and of FIG. 10, the foil element 10 is shown in place in the cartridge 12 prior to insertion of the journal 14. As shown in the right-hand side of FIGS. 1, 3 and 10, and in the partial section in FIGS. 2 and 4, when the journal is inserted (generally by means of a conical "nose" to provide a gradual lead), the quasi-polygonal section 18 and the initially plane inner and outer sections 16 and 20 conform to the cylindrical wall of the cartridge 12 and the cylindrical journal 14 within the annulus therebetween. The rounded vertices 28 of the quasi-polygonal section 18 bear against the cartridge wall (FIGS. 1 and 2) or the outer foil portion 16 (FIGS. 3 and 4). The sides 26 become quasi-circular while the radiused bends of the vertices deform by spreading.

The quasi-polygonal support 18 may have as few as three sides and as many as are desired, although a convenient maximum may be 24 or 48 sides. In general, the radii and the number of the vertices 28 and the angle between the sides are selected in conjunction with other parameters so as to obtain desired flexure characteristics of the backing between the bore of the cartridge 12 and the bearing surface 30.

The effective clearance between the rotating journal and the foil-bearing surface 30 depends among others on the number of turns in the foil 10, the foil-thickness and elasticity, the height of the deformed vertices 28 and on the amount of interstitial clearance, all in relation to the width of the annulus between the journal and the inner cartridge diameter. It is possible to regulate the initial preload on the journal by variation of the aforesaid and other parameters to ensure desirable operating characteristic of foil bearings and rotor. The amount of initial preload depends largely on the non-linear, overall stiffness characteristics of the support and may be easily determined by empirical means.

The foil 10 may typically be of metal (or other suitable material) such as stainless spring-steel or copper beryllium 0.001 to 0.005in. (0.025 to 0.125mm) thick. However, it will be appreciated by those skilled in the art that the respective thickness of the portions 16, 18 and 20 need not be identical, since various sections may be plated or etched, as discussed in more detail hereinafter. This provides additional flexibility of design, while retaining the very important feature of foil continuity and the absence of junctions and welds. Of course, the number of foil layers or turns is also important since this affects both stiffness and damping. Since foil flexure varies with the cube of the thickness, the continuous multilayer construction with inner and outer layers of initially plane foil-sections 16 and 20 preceding and following the central quasi-polygon section 18 backing the inner foil portion 16, gives a multiplicity of suitable and advantageous combinations in design. By virtue of the multiturn foil integral with a quasi-polygonal portion 18 as described, there exists the ability to provide resilience as well as frictional and fluid damping by the capacity to deflect and simultaneously induce interlayer rubbing and interstitial squeezing of the fluid film. The frictional surface characteristics may be varied by suitably coating, etching or sand-blasting the foil along the entire length of the strip. As discussed below, a matrix pattern of raised areas may also be provided to modify the interstitial clearance and provide a tortuous path between the flexible foil-layers to enhance damping.

As shown by the arrow in FIGS. 1 and 3, rotation is opposite in sense to the direction given in proceeding from the outer to the inner foil end and the slot 24 thus provides a positive stop for the foil, with no tendency to drag the foil in the direction of rotation and to diminish the clearance. The arrested end of the foil is straight and need not be bent into the slot.

Figure 5:
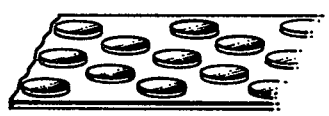
FIGS. 5 and 6 are perspective views of foil portions provided with a matrix pattern of protuberances on their respective surface.
Figure 6:
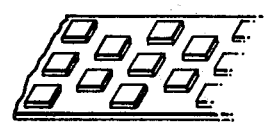

In order to enhance interstitial fluid damping between foil layers, a matrix pattern, as for example those shown in FIG. 5 (raised circular lands) and FIG. 6 (raised quadrilateral lands), may be provided on foil portions 16 and 20. Conventional techniques, such as plating or spraying, may be utilized, and with substances of desirable friction characteristics. The patterns may also be etched. In addition, the foil portions 16 and 20 may be etched through, the selected matrix of perforations providing means for additional damping by squeezing of the fluid in, out and between interstices. Further, means of external pressurization may be utilized, and porous foils may also be used.

Figure 7:
FIGS. 7 and 8 are perspective views of the innermost foil portions which have been provided with a herringbone-groove pattern and a pocketed Rayleigh-shoe pattern respectively.
Figure 8:
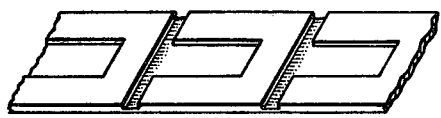

As further shown in the drawings, the bearing surface 30 may be provided with conventional topographies such as a herringbone-groove pattern (FIG. 7), or a pocketed Rayleigh-shoe pattern (FIG. 8). The surface 30 may also be coated with a suitable dry lubricant and first sand-blasted for better retention of the dry lubricant, while the other surfaces, as for example, the outermost surface of portion 16 may be treated to provide increased friction.

Figure 9:
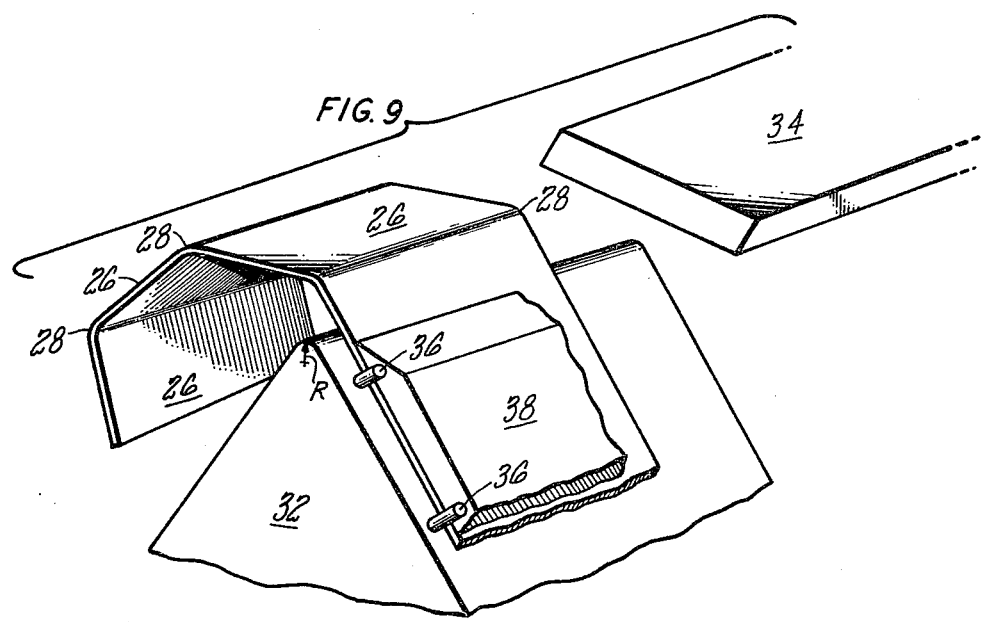
FIG. 9 is an exploded perspective view of apparatus for bending foils into quasi-polygonal forms.

A simple method of bending foils into a quasi-polygonal form is illustrated in FIG. 9. A bending block 32 has a radius R at its upper corner, over which the foil 10 is bent by means of flat plate 34. The edge of foil 10 is referenced to two guide pins 36 and held in position during bending by a hold-down plate 38 which is provided with a quick clamp-and-release mechanism (not shown). Thus, the foil is advanced by the proper length between bends. The block 32 may be provided with a simple protractor, adjustable pointer, or stop (not shown) for gauging or setting the angle of bend.

Since the bending radius R at the vertex 28, the length of the sides 26 and the angle included between the sides of the open polygon can all be varied, the degree of stiffness of the quasi-polygonal backing-sector 18 may be controlled not only through the thickness and elastic properties of the foil, but also through controlled deflection of the radiused vertices 28 and the deflection of the span 26 between the vertices, upon fitting of the journal into the bearing. If the vertex angle after the bending operation depicted in FIG. 9 is less than that of a corresponding regular polygon, the sides 26 become convex when the verticies lie on a cylinder sensibly equal to the journal 14, as shown schematically on the left-hand side of FIG. 10. When the journal 14 is inserted and when the bearing is operational, the polygonal portion 18 tends to conform to a cylinder except at the radiused vertices 28, as indicated in the upper right-hand part of FIG. 10. The lower right-hand portion of FIG. 10 is a free body diagram showing the reactions at the vertices and contact pressure on a section of the support 18, in a qualitative manner. Of course, those skilled in the art will recognize that foil thickness and clearances have been grossly exaggerated in all figures for the purpose of clarity of illustration.

Figure 11:
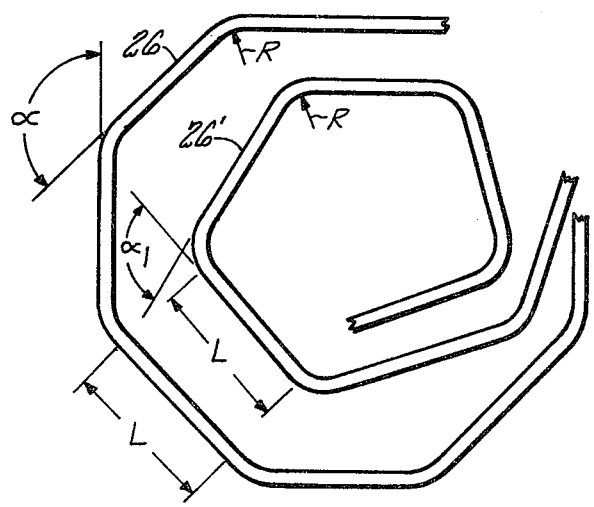
FIG. 11 is an end view of two quasi-polygonal foil portions.

FIG. 11 shows two separate foil portions which are identical (e.g. the sides 26 and 26' have the same length L and the vertices 28 have the same radius of curvature R except that the angle $\alpha$ included between the sides 26 is greater than the angle $\alpha$, included between the sides 26'.

Figure 12:
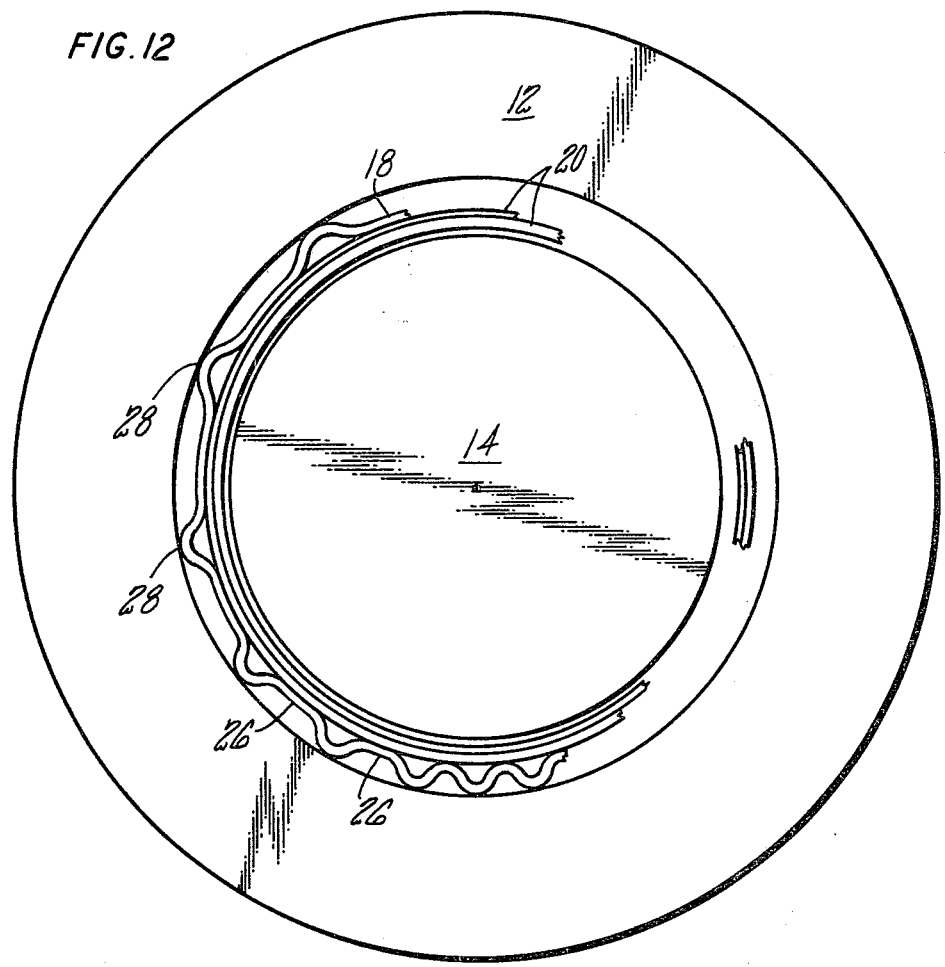
FIG. 12 is a partial end view of an alternate embodiment of a journal bearing.

FIG. 12 illustrates a journal bearing wherein some of the sides 26 are of unequal length, some of the rounded vertices 28 have unequal radii of curvature and the thickness of the foil portions 18 and 20 is unequal.

By way of summary, the present invention provides an improved fluid-film resilient journal bearing with many advantages. Some are:

(a) Ability to operate rotors at high speeds. Instability is suppressed by damping inherent in the compliant foil-inserts of the bearings. The flexibility of the quasi-polygonal backing and of the foil-insert as a whole, accompanied by relative motion between foil layers and between the coil and cartridge bore, provide means of energy dissipation which add considerably to the damping of the lubricating film, so that self-excited whirl either does not occur, or is limited to a small and safe orbit. Furthermore, amplitudes of vibrations at resonance are greatly diminished.

(b) Accommodation of relatively large misalignment and imperfections of manufacture, arising out of assembly and fabrication of the rotor, housing and the bearing itself.

(c) Tolerance of contaminants and particles entering or originating in the bearing clearance by providing both surface and support flexibility with the ability to deflect, not only as a whole, but also locally.

(d) Superior wipe-wear characteristics at high speeds, starting and stopping. Because of surface compliance, contact and associated dissipation of energy are distributed over a much larger area, rather than concentrated, as in rigid bearings. Moreover, contact is largely elastic rather than characterized by dissipation of energy in the inelastic (plastic) and destructive deformation of bearing surfaces.

(e) An ability to accommodate larger rotor excursions, such as those due to unbalance, since the bearing surface and support can deflect. There is far less danger of full-force journal impact, such as in the case of rigid bearing-shells. The constraint of the bearing clearance of a rigid and fixed bearing, which is particularly small in the case of gas bearings, is thus removed. The rotor can be allowed much larger excursions, within the clearance limits of seals (labyrinth) and wheel tips, which are generally an order of magnitude larger than the clearances of hydrodynamic journal bearings, especially gas bearings.

(f) Much greater accommodation of differential expansion of cartridge and journal and of dimensional changes due to thermal distortion, due to the compliance of surface and flexibility of support. Temperature gradients can be accommodated with much greater ease than in gas bearings that are rigid, and dimensional changes are, therefore, less harmful. This is particularly important in the application to modern, high-temperature, high-speed turbomachinery.

What has been set forth above is intended primarily as exemplary to enable those skilled in the art to practice the invention, and it should therefore be understood that, within the scope of the appended claims, the invention may be practiced in other ways than as specifically described. It is contemplated, for example, that the resilient foil-insert may comprise the quasi-polygonal section only, with the inner sides thereof providing the bearing surface.

I claim:

1. In a journal bearing comprising a stationary retaining member having a bore, a rotating journal having a bearing surface and, within said bore, a resilient foil-insert having a bearing surface wherein a fluid film is induced between said bearing surfaces, the improvement in said foil-insert which comprises a continuous length of foil having a portion thereof initially preformed to the shape of an open polygon and coiled within said bore, said initial polygon having a plurality of rounded vertices of prescribed curvatures and a plurality of sides joining and tangent to said rounded vertices, said sides being of prescribed lengths and being inclined to one another at prescribed angles.

2. The invention of claim 1 wherein said vertices are contiguous to the bore of said retaining member.

3. The invention of claim 1 wherein said sides are contiguous to said journal.

4. The invention of claim 1 wherein said polygon portion is preceded by a plane foil section.

5. The invention of claim 1 wherein said polygon portion is succeeded by a plane foil section.

6. The invention of claim 1 wherein said polygon portion is both preceded and succeeded by plane foil sections.

7. The invention of claim 1 wherein said length of foil is of variable thickness.

8. The invention of claim 1 wherein said length of foil is of variable surface quality.

9. The invention of claim 1 wherein said vertices have unequal curvature.

10. The invention of claim 1 wherein said sides are of unequal length.

11. The invention of claim 1 wherein said angles are unequal.

12. The invention of claim 1 wherein one of said bearing surfaces is provided with a herringbone-groove pattern.

13. The invention of claim 1 wherein one of said bearing surfaces is provided with a pocketed Rayleigh-shoe pattern.

14. The invention of claim 1 wherein said foil is provided with a matrix pattern of protuberances on its surface.

* * * * *